US009473479B2

(12) United States Patent
Tanase

(10) Patent No.: US 9,473,479 B2
(45) Date of Patent: Oct. 18, 2016

(54) AUTOMATING AUTHENTICATION WITH MULTI-CHANNEL MEDIA DISTRIBUTORS

(71) Applicant: Adobe Systems Incorporated, San Jose, CA (US)

(72) Inventor: Narcis-Ciprian Tanase, Bucharest (RO)

(73) Assignee: Adobe Systems Incorporated, San Jose, CA (US)

( * ) Notice: Subject to any disclaimer, the term of this patent is extended or adjusted under 35 U.S.C. 154(b) by 109 days.

(21) Appl. No.: 14/288,938

(22) Filed: May 28, 2014

(65) Prior Publication Data

US 2015/0350173 A1     Dec. 3, 2015

(51) Int. Cl.
*G06F 17/30*     (2006.01)
*H04L 29/06*     (2006.01)

(52) U.S. Cl.
CPC ............. *H04L 63/08* (2013.01); *H04L 63/10* (2013.01)

(58) Field of Classification Search
CPC ............................... H04L 63/08; H04L 63/10
See application file for complete search history.

(56) References Cited

U.S. PATENT DOCUMENTS 8,732,855 B2 * 5/2014 Thomas .................. 715/745
8,856,869 B1 * 10/2014 Brinskelle .......... H04L 63/08
                                                                                    726/12
2007/0136258 A1 * 6/2007 Yamamoto ........ G06F 17/30613
2015/0341334 A1 * 11/2015 Bhimanaik ........... G06F 21/335
                                                                                    726/4

OTHER PUBLICATIONS

Adobe Access Overview, Version 4.0, Apr. 2012, 18 pages.

\* cited by examiner

*Primary Examiner* — Mohammed Waliullah

(74) *Attorney, Agent, or Firm* — Kilpatrick Townsend & Stockton LLP

(57) ABSTRACT

In some embodiments, a processing device extracts a cookie from a first media application that is prevented from providing the cookie to a second media application. The cookie includes authentication information that is associated with an authentication of the first media application with a multi-channel media distributor for accessing a first media channel. The processing device copies the extracted cookie to a shared storage resource that is accessible to both the first media application and the second media application. In response to the second media application accessing a second media channel, the processing device retrieves the extracted cookie from the shared storage resource. The second media application provides the authentication information from the extracted cookie to the multi-channel media distributor for authenticating the second media application to access the second media channel.

20 Claims, 5 Drawing Sheets

AUTOMATING AUTHENTICATION WITH MULTI-CHANNEL MEDIA DISTRIBUTORS

TECHNICAL FIELD

This disclosure relates generally to computer-implemented methods and systems and more particularly relates to automating authentication with multi-channel media distributors.

BACKGROUND

Multi-channel media distributors provide or otherwise manage access to multiple media content channels. For example, a user may have a subscription to a cable television provider or other multi-channel media distributor. The subscription allows a user to access multiple channels of media content from different media providers (e.g., a news channel, a cooking channel, a movie channel, etc.) via the cable television provider. Some providers of media content may provide access to media content over the Internet in addition to providing televised content. For example, a news organization may broadcast news programs over a cable television channel and provide access to the same news programs via the news organization's website.

A subscription with a multi-channel media distributor may allow a user to access both the televised broadcasts and the web content provided by the news organization or other media content provider. For example, the subscription may include authentication credentials (e.g., a user name and password) that allow a user to access online content from websites hosted by media content providers that are also affiliated with the multi-channel media distributor. For example, a cable television provider may include a first channel with content from a news organization and another channel with content from a movie studio. A subscription to the cable television provider may include authentication credentials that can be used to access online content from the news organization's website and the movie studio's website. In some cases, accessing each media content provider's website may cause the user to be redirected to an authentication web page for the multi-channel media distributor, which can require the user to re-enter the authentication credentials each time the user accesses a different website associated with a respective media channel.

Some solutions allow authentication credentials for a multi-channel media distributor to be entered once by a user without requiring re-entry each time the user accesses a different media channel associated with the multi-channel media distributor. For example, a third party service such as Adobe Pass may generate an authentication token after authentication with the multi-channel media distributor and use the authentication token to obtain access to different media channels.

Existing solutions for automating authentication with a media channel provider across different media channels may present disadvantages. For example, some multi-channel media distributors may prohibit the use of authentication tokens to facilitate access across different media channels. This problem may be addressed by using authentication credentials stored in a cookie to authenticate a user with the media content provider when websites for different media channels are accessed. However, some devices, such as smart phones and tablet computers, may enforce strict sandboxing policies that prevent the sharing of cookies between different applications. If different media applications are used to access different media channels on such computing devices, a user may be unable to use third party services such as Adobe Pass to access different media channels without repeatedly entering authentication credentials.

It is desirable to provide automated authentication with multi-channel media content providers in sandboxed computing environments that prevent sharing of cookies between media applications.

SUMMARY

According to certain embodiments, computing devices can automate an authentication of different media applications with a multi-channel media distributor that can authorize access to multiple media content channels. For example, a computing device such as a smart phone may include several media applications for accessing media content provided by different channels (e.g., a cooking channel, a movie channel, etc.). A multi-channel media distributor (e.g., a cable television provider) may authorize access to both channels by the same subscriber. However, the computing device may execute both media applications in a sandboxed environment in which a first media application is prevented from providing a cookie containing authentication information for the multi-channel media distributor to a second media application. In such a sandboxed environment, the computing device can extract the cookie from the first media application and store the extracted cookie to a shared storage resource. The cookie can be generated when the first media application is authenticated with the multi-channel media distributor for accessing a first media channel provided by multi-channel media distributor (e.g., when a subscriber uses the first media application to access a cooking channel). The computing device can subsequently access the extracted cookie from the shared storage resource in response to the second media application accessing the multi-channel media distributor (e.g., in response to the subscriber using the second media application to access a movie channel). The second media application can provide the authentication information from the extracted cookie to the multi-channel media distributor such that the second media application is authenticated to access the second media channel. In some embodiments, the authentication information from the extracted cookie can be provided to the multi-channel media distributor via an invisible interface such that the process of authenticating the second media application is hidden from a user of the computing device.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
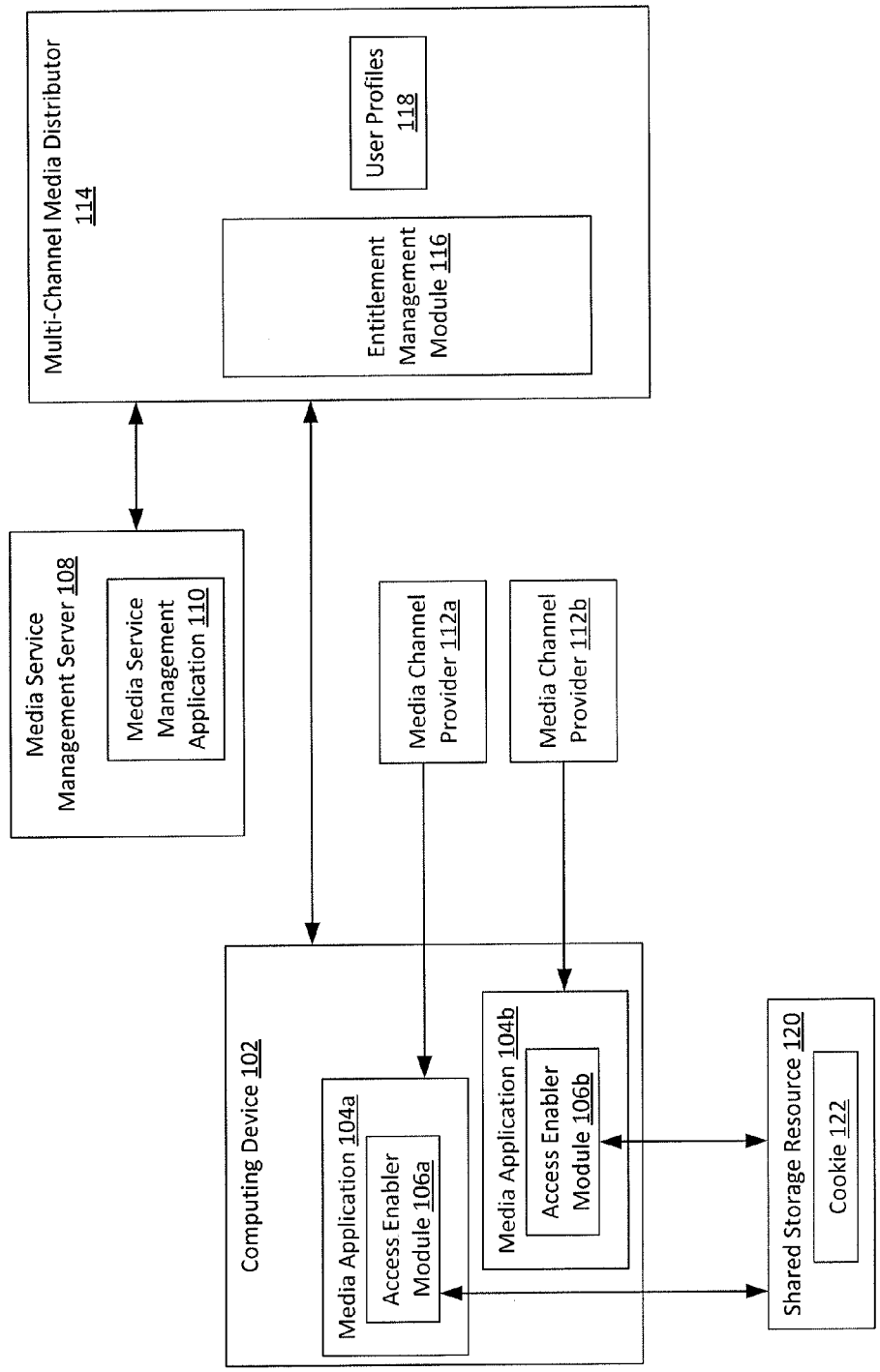
FIG. 1 is a block diagram depicting an example of a system for automating authentication of media applications with multi-channel media distributors that provide access to media content from media channels according to certain exemplary embodiments.

Computer-implemented systems and methods are disclosed for automating authentication with multi-channel media distributors. One or more software modules can use authentication information from a cookie generated by a first media application to authenticate a second media application with a multi-channel media distributor. The software modules can do so even if a computing device enforces a sandboxing policy that prohibits cross-application sharing of cookies. The disclosed methods can thereby allow computing devices that prohibit cross-application cookie sharing to automatically authenticate users with multi-channel media distributors.

The following non-limiting example is provided to help introduce the general subject matter of certain embodiments. A cable television service or other multi-channel media distributor may authorize access to both channels by the same subscriber. For example, the subscriber may have a smart phone with a first media application (e.g., a "CookTV" application) for accessing a cooking channel provided by the cable service and a second media application (e.g., a "ActionMovie" application) for accessing a movie channel provided by the cable service. The cable service may require the subscriber to be authenticated via the cable service's website each time a different channel is accessed (e.g., once for using the "CookTV" application and again for using the "ActionMovie" application).

This authentication process can be automated so that the subscriber is not required to manually enter his or her authentication credentials each time a different media application is used. For example, logging into the cable service's website to authenticate the "CookTV" application can generate a cookie with authentication information. The operating system of the smart phone may prevent the "CookTV" application from directly sharing the cookie with the "ActionMovie" application. However, access enablement software on the smart phone can extract the cookie from the "CookTV" application and store the extracted cookie to a shared storage resource that is accessible by the "ActionMovie" application. When the subscriber uses the "ActionMovie" application, the access enablement software can access the extracted cookie from the shared storage resource and provide the authentication information from the extracted cookie to the cable service. For example, the access enablement software can instantiate an invisible interface for accessing the cable service website and submit the authentication information via the invisible cable service website interface. In this manner, the process of authenticating the multiple media applications (e.g., smart phone application for accessing cable channels) via a subscription to a common multi-channel media distributor (e.g., a cable television service) is at least partially hidden from a user.

As used herein, the term "multi-channel media distributor" is used to refer to an entity or a service that can manage access to media content over different programming channels. Non-limiting examples of media content include video content, audio content, etc. In some embodiments, the multi-channel media distributor may provide access to multiple programming channels based on a user or other entity having a subscription with the multi-channel media distributor. The subscription with the multi-channel media distributor may allow a user or other entity to access media content over different types of communication networks. For example, a cable television provider may manage a user's access to televised content available via a cable television channel and to electronic content accessible via a website.

As used herein, the term "media application" is used to refer to any application that can be used to display, execute, or otherwise use media content provided over a media channel. In some embodiments, a media application can access media content over different channels. For example, a web browser application may access media content from different channels over different websites. In additional or alternative embodiments, a media application can be an application that is designed for accessing media content over specific channels. In a non-limiting example, a provider of online video content (e.g., a cooking website) may provide an application (e.g., "CookTV") that can be installed on a computing device and used specifically to access video content from only that provider. In some embodiments, such a media application may be a native application that is specifically configured to access content from a given media channel and, unlike a web browser, may be unable to access content from other media channels.

As used herein, the term "sandboxing" is used to refer to one or more security processes executed by a computing device to prevent communication between two or more applications executed on the computing device. For example, each of multiple applications may be executed in a sandboxed environment that is a container or other logical object within an operating system. A sandbox container can constrain the respective application from accessing shared resources, such as a shared file system or other memory locations accessible by multiple applications. In some embodiments, the sandbox container can provide access to a limited subset of the shared resources of the operating system, such as a portion of a shared file system. A clipboard function provided by the computing device can be a shared resource that is excluded from a sandbox container. In some embodiments, a sandboxed environment can permit an application to access websites and interfaces generated by the websites and can also prevent sharing of data generated by the application with other applications in the sandboxed environment. Non-limiting examples of such sandboxed environments include devices having an iOS operating system, devices having an Android operating system, gaming consoles and/or set-top boxes that allow the installation and/or development of third-party applications, etc.

As used herein, the term "cookie" is used to refer to data generated by a visit to a website or other resource accessible over a data network that describes one or more aspects of the visit to the website or other resource. For example, a cookie can store authentication credentials or other data used to access the website. Data other than authentication credentials that can be used to access a website includes session data. For example, an identity provider (i.e., an endpoint for a multi-system operator or other media channel provider) that is implemented in PHP can generate a PHPSESSID cookie for linking a client device with a session on a server that communicates with the client device via the session. A cookie can be stored in a memory location that is accessible to a web browser application or other application.

As used herein, the term "shared storage resource" is used to refer to a storage resource that can be accessed by multiple applications in a sandboxed environment. In some embodiments, the shared storage resource can be a memory location in a non-transitory computer-readable medium of a computing device that communicates with a remote media provider. In additional or alternative embodiments, the shared storage resource can be remotely accessible via a data network (e.g., a cloud-based storage resource). In one non-limiting example, applications in a sandboxed environment may be prohibited from providing data to one another, but may be permitted to store data in specific storage devices on a device (e.g., a secure digital card or other non-volatile memory card format that can be used in portable computing devices). Different file reader applications can access files from the storage device. Such storage devices can be used to implement the shared storage resource. For example, a file that includes entitlement data (e.g., tokens and cookies) can be stored on a secure digital card. The entitlement data can optionally be encrypted to protect sensitive data. For example, stored cookies may be encrypted and tokens may be un-encrypted, as they are digitally signed and are bound to the device via a unique device identifier. In another non-limiting example, an operating system such as iOS may provide a pasteboard that is accessible by multiple applications, subject to one or more restrictions (e.g. applications developed by the same company). The shared storage resource can use the pasteboard for sharing entitlement data among applications subject to the restrictions.

As used herein, the term "media channel" is used to refer to any manner of delivering media content to a user. In one non-limiting example, a media channel may be a website hosted by a provider of media content, such as a website that provides online access to news programs that are also provided over a television channel. In another non-limiting example, a media channel may be a section of a website that is used to host content by a specific media content provider. For example, a cable television provider may host a website that includes a first section for content provided by a news channel, a second section for content provided by a movie channel, etc.

A multi-channel media distributor can store authentication data for a given user in a user profile. A user profile can include data associated with a logical entity that can be uniquely identified by a document management application. A user profile can be used for entities such as individuals, organizations, etc. A given user can be identified by reference to one or more client accounts, by reference to a software identifier and/or hardware identifier associated with an application and/or device used to access the server system, etc.

Referring now to the drawings, FIG. 1 is a block diagram depicting an example of a system for automating authentication of media applications with multi-channel media distributors to access media resources from media channels. As depicted in FIG. 1, a computing device 102 can access media content from media channels that are provided by multiple media channel providers 112a, 112b. A user of the computing device 102 can subscribe to a multi-channel media distributor 114, such as a multi-system operator, that manages user access to the media channel providers 112a, 112b. For example, a user of the computing device 102 can subscribe to a cable television provider or other multi-channel media distributor 114 that provides access to one or more media channels (e.g., a cooking channel, a news channel, a movie channel, etc.). The subscription information for users of the multi-channel media distributor 114 can be included in user profiles 118 that are stored at or accessible to a server system of the multi-channel media distributor 114.

A media service management server 108 can execute a media service management application 110 that facilitates access to different media channels by the computing device 102. For example, the media service management application 110 can facilitate exchanges of entitlement data (e.g., authentication data, authorization data, etc.) between the computing device 102 and the multi-channel media distributor 114 without requiring a user of the computing device 102 to repeatedly enter authentication credentials for the multi-channel media distributor 114, as described in detail below. In some embodiments, the media service management server 108 may be a single computing system. In other embodiments, the media service management server 108 may be a virtual server implemented using multiple computing systems connected in a grid or cloud computing topology. Although FIG. 1 depicts the media service management server 108 as a single block for illustrative purposes, the media service management server 108 can include a server or a group of servers configured in a shared computing environment (e.g., cloud computing) for performing any number of functions in addition to those performed by the media service management application 110.

The media service management application 110 can communicate with access enabler modules 106a, 106b that are included in or accessible to media applications 104a, 104b. The media applications 104a, 104b can be executed by the computing device 102 to access media channels of the media channel providers 112a, 112b. For example, a first media application 104a (e.g., a "CookTV" application) can be used to access a cooking channel provided by the media channel provider 112a and a second media application 104b (e.g., an "ActionMovie" application) can be used to access a movie channel provided by the media channel provider 112b. The access enabler modules 106a, 106b can be provided in a library accessible to developers of the media applications 104a, 104b. The access enabler modules 106a, 106b can be used by the developers of the media applications 104a, 104b to enable a user of the computing device 102 to access media content provided by the media channel providers 112a, 112b. The access enabler modules 106a, 106b can be implemented on any suitable computing device 102 configured with any suitable operating system.

The media service management application 110 can facilitate access to media content using entitlement data. Entitlement data can include tokens, cookies, or other data that is used to control access to content by a given user or other entity. One example of entitlement data is an authentication token, which indicates that a user or other entity has been successfully authenticated with the multi-channel media distributor 114. An authentication token can be provided to a computing device 102 in response to a user of the computing device 102 being authenticated with the multi-channel media distributor 114 (e.g., by navigating to an authentication page of the multi-channel media distributor and entering authentication credentials at the authentication page). Another example of entitlement data is an authorization token, which indicates that an authenticated user of the multi-channel media distributor 114 is authorized to access a specific media channel. For example, the user profile 118 may indicate that a user is authorized to access media channels provided by both a media channel provider 112a and a media channel provider 112b. An authorization token can be provided to the computing device 102 in response to the computing device 102 accessing one or more of the media channel providers 112a, 112b. The media applications 104a, 104b can use authorization tokens to access media channel providers 112a, 112b.

The access enabler modules 106a, 106b and the media service management application 110 can exchange entitlement data via a single sign-on process. The single sign-on process can include one or more operations that allow a user of the computing device 102 to access media channels without manually entering authentication credentials at an authentication page of the multi-channel media distributor 114 each time the user accesses a different media channel.

In some embodiments, a web browser can execute a single sign-on process using the access enabler modules 106a, 106b with the media service management application 110. The web browser can be used to access a website provided by a first media channel provider 112a and including an access enabler module. An access enabler module initiates the authentication process. The web browser can be redirected to an authentication page of the multi-channel media distributor 114. Authentication credentials can be entered at the authentication page and provided to the multi-channel media distributor 114. The multi-channel media distributor 114 can execute the entitlement management module 116 to authenticate the user. Authenticating the user can involve verifying that the authentication credentials received via the authentication page match the authentication credentials of one of the user profiles 118. The entitlement management module 116 can notify the media service management application 110 that the authentication was successful. In response to receiving notification of the successful authentication, the media service management application 110 can create an authentication token and store the authentication token for the user on the media service management server 108. An access enabler module in the media channel provider's webpage can configure the computing device 102 to retrieve the authentication token from the media service management server 108 and store the authentication token in a web storage object. The user can subsequently access a different website provided by a second media channel provider 112b, where the website of the second media channel provider 112b also includes an access enabler module. If the multi-channel media distributor 114 permits a single sign-on process to be used, the stored authentication token can be used to access the website of the second media channel provider 112b.

In the single sign-on process, a user can enter authentication credentials once via an authentication interface provided by the multi-channel media distributor 114. An authentication token can be generated from the single sign-on process. The authentication token is used by each of the media applications 104a, 104b. For example, a user can open the media application 104a. The user can enter authentication credentials for authenticating the media application 104a with a multi-channel media distributor 114 that does not require passive authentication. An authentication token is created by the media service management application 110 and is transferred to the computing device 102. The user may then switch to the media application 104b. The access enabler module 106b of the media application 104b detects the multi-channel media distributor 114 token, determines that the multi-channel media distributor 114 does not require passive authentication, and uses the authentication token to allow media application 104b to access content without requiring an explicit login via an authentication interface of the multi-channel media distributor 114 from the media application.

Some multi-channel media distributors may require that a user navigate to an authentication page of the multi-channel media distributor whenever the user switches between media applications 104a, 104b. For example, the multi-channel media distributor 114 may gather data about a user each time a media channel is accessed in order to generate statistics or other analytics for the user profiles 118. The multi-channel media distributor 114 may not allow the access enabler modules 106a, 106b and the media service management application 110 to implement a single sign-on process. If the multi-channel media distributor 114 does not allow the access enabler modules 106a, 106b and the media service management application 110 to implement a single sign-on process, a passive authentication process can be used.

In the passive authentication process, the user can enter credentials once via (e.g., via a first media application 104a). A second media application 104b can subsequently navigate to an authentication interface provided by the multi-channel media distributor 114. Two authentication tokens for the respective media applications 104a, 104b are generated and stored on the computing device 102. For example, a user can open the media application 104a. The user can enter authentication credentials for authenticating the media application 104a with a multi-channel media distributor 114 that requires passive authentication. An authentication token can be created by the media service management application 110 and transferred to the computing device 102. Cookies that are generated by or otherwise obtained from the multi-channel media distributor 114 login are copied to a shared storage resource along with the authentication token. If the user switches to the media application 104b, the access enabler module 106b detects the authentication token, determines that the multi-channel media distributor 114 requires passive authentication, and thus determines that the authentication token cannot be used for single sign-on. The access enabler module 106b can trigger passive authentication, which can cause a new authentication token to be generated for the media application 104b to access the multi-channel media distributor 114.

Any suitable solution can be used to implement a passive authentication process. For example, the media service management application 110 may use protocols compatible with a Security Assertion Markup Language ("SAML") that may be used by the multi-channel media distributor 114 to generate an authentication interface for authenticating a user. For example, an "IsPassive" parameter can be included in a SAML authentication request (e.g., "AuthnRequest") transmitted by one of the media applications 104a, 104b via a WebView component. If the user selects a multi-channel media distributor 114 that prohibits the use of a single sign-on process, the access enabler module can send a request with "IsPassive=true" to the multi-channel media distributor 114. The "IsPassive" parameter informs the multi-channel media distributor 114 that if the user is not authenticated, it should fail silently with a redirect to a custom URL provided by the media service management application 110 instead of returning an error page or displaying a message to the user. If the passive authentication process succeeds (assuming the user has already authenticated in another application and the login cookies are shared), an authentication token can be generated and the media application can be redirected to a custom URL generated by the media service management application 110. If the passive authentication process fails (e.g. login cookies not present), then an authentication token is not generated. The media application is redirected to the custom URL, signaling that the passive authentication process has ended. If the media application queries the access enabler module regarding the authentication state of the user (e.g., via a "checkAuthentication" process), the query can return "FALSE." The user can manually enter authentication credentials via the media application.

For media channels accessible via websites of the media channel providers, an access enabler module in a web browser application can use authentication data stored in cookies to authenticate a user. For example, if the multi-channel media distributor 114 does not permit a passive authentication process to be used, an invisible interface (e.g., an iFrame or other web interface) can be instantiated in the web browser. The authentication page of the multi-channel media distributor 114 can be accessed via the invisible interface. Data from a cookie (e.g., session information) can be transmitted to the multi-channel media distributor 114. The session data can indicate to the multi-channel media distributor 114 that a media application executed at the computing device 102 has established a session with the multi-channel media distributor 114 and that a user of the computing device 102 has been authenticated for that session.

The passive authentication process described in the example above can be performed by a web browser application that can share cookies between different web sites of different media provider channels 112a, 112b. However, a computing device 102 such as a smart phone may execute media applications 104a, 104b in an environment that uses an aggressive sandboxing policy (e.g., an iOS operating system or an Android operating system). Sandboxing can hinder the sharing of cookies or other entitlement data between media applications 104a, 104b executed on the computing device 102. For example, different cookie management classes used by different operating systems (e.g., NSHTTPCookieStorage for iOS, android.webkit.CookieManager for Android, etc.) may limit cookie sharing to different processes within the same application. Such sandboxing policies can prevent a media application 104a from providing a cookie to a media application 104b.

The access enabler modules 106a, 106b can enable sharing of authentication information between media applications 104a, 104b. The sharing of authentication information can allow automated authentication of media application 104a, 104b in a sandboxed environment that is used to access a multi-channel media distributor 114 that does not permit passive authentication. For example, a shared storage resource 120 can be used to share a cookie 122 between the media applications 104a, 104b. In some embodiments, the shared storage resource 120 can be used to store complex data structures (e.g., nested arrays and maps, Boolean values, integer and string values, etc.). The shared storage resource 120 can be implemented in any suitable manner. Non-limiting examples of a shared storage resource 120 include a UIPasteboard object on a computing device 102 with an iOS operating system, a SQLite database on a computing device 102 with an Android operating system, etc.

Although FIG. 1 depicts various functional blocks at different positions for illustrative purposes, other implementations are possible. For example, although FIG. 1 depicts two media applications 104a, 104b for accessing two media channel providers 112a, 112b, any number of media applications can be used for accessing any number of media channel providers. FIG. 1 also depicts the media applications 104a, 104b as including respective access enabler modules 106a, 106b. However, in some embodiments, one or more access enablement modules separate from the media applications 104a, 104b may be accessed by the media applications 104a, 104b to perform one or more operations described herein.

Figure 2:
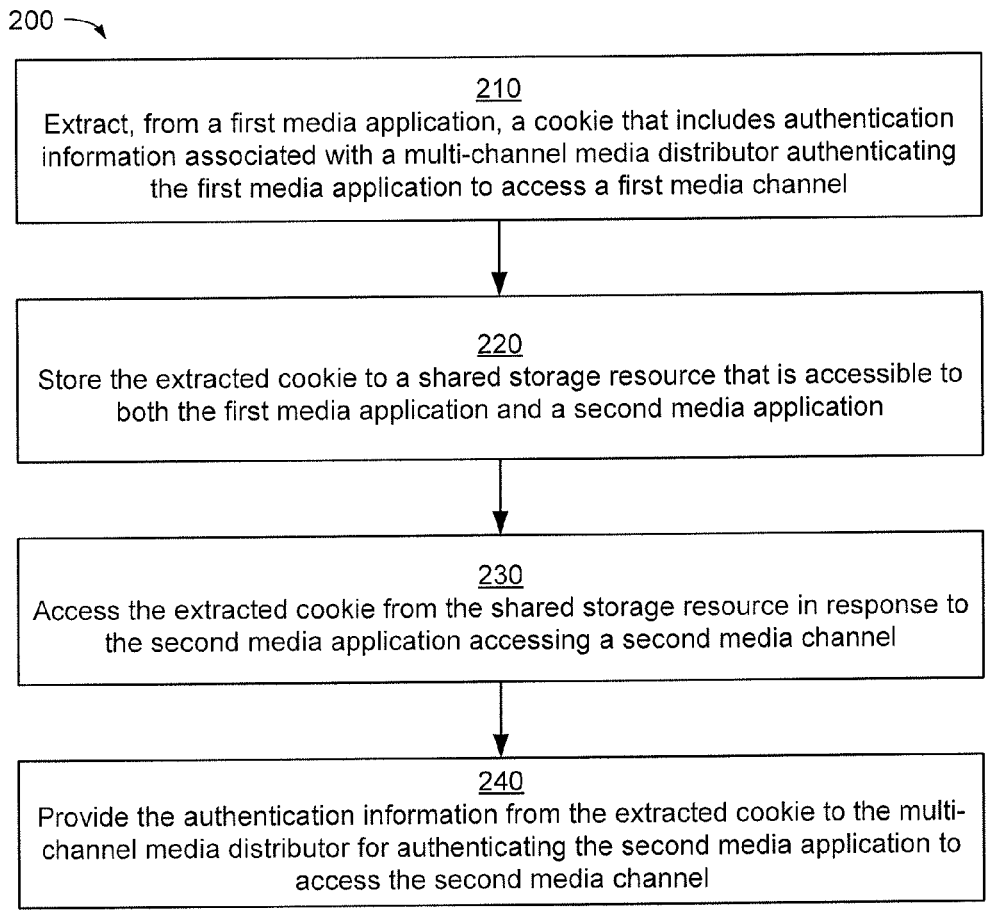
FIG. 2 is a flow chart illustrating an example of a method for automating authentication with multi-channel media distributors according to certain exemplary embodiments.

FIG. 2 is a flow chart illustrating an example of a method 200 for automating authentication with a multi-channel media distributor in a sandboxed environment. For illustrative purposes, the method 200 is described with reference to the implementation depicted in FIG. 1. Other implementations, however, are possible.

The method 200 involves extracting a cookie 122 from a first media application 104a, where the cookie 122 includes authentication information associated with the authentication of the first media application 104a with a multi-channel media distributor 114 for accessing a first media channel, as depicted in block 210. For example, the computing device 102 can execute an access enabler module 106a to extract a cookie 122 from the media application 104a. The cookie 122 can include authentication information such as (but not limited to) session information that indicates to a multi-channel media distributor 114 that a session with the computing device 102 has been established and that a user of the computing device 102 is authenticated with the multi-channel media distributor 114, a user name and password that was provided from the media application 104a to the multi-channel media distributor 114 during an authentication process, etc.

In a non-limiting example, the cookie 122 can be generated in response to the media application 104a accessing a media channel of a media channel provider 112a. The media channel provider 112a can redirect the media application 104a to a website or other authentication interface provided by the multi-channel media distributor 114. A user of the computing device 102 can input authentication credentials for the multi-channel media distributor 114 into the website or other authentication interface provided by the multi-channel media distributor 114. The media application 104a can store authentication information for a session with the multi-channel media distributor 114 in a cookie 122. The access enabler module 106a can extract the cookie 122.

The cookie 122 may be inaccessible to a second media application 104b. For example, a restraint on the computing device 102 may prevent the second media application 104b from receiving the cookie from the first media application 104a. Such a restraint may be imposed by or otherwise associated with a sandboxing policy for an operating system of the computing device 102.

The method 200 also involves storing the extracted cookie 122 to a shared storage resource 120 that is accessible to both the first media application 104a and a second media application 104b, as depicted in block 220. For example, the computing device 102 can execute the access enabler module 106a to store the extracted cookie 122 to the shared storage resource 120.

In some embodiments, the shared storage resource 120 can be a data structure or other resource that is stored in a non-transitory computer-readable medium local to the computing device 102. In other embodiments, the shared storage resource 120 can be a remote data source accessible via a data network. For example, a cloud service may be accessible via the access enabler modules 106a, 106b. The shared storage resource 120 can be provided by the cloud service for a user profile.

The method 200 also involves accessing the extracted cookie 122 from the shared storage resource 120 in response to the second media application 104b accessing a second media channel, as depicted in block 230. For example, accessing a media channel provided by the media channel provider 112b may require authentication by the multi-channel media distributor 114. The computing device 102 can execute the access enabler module 106b in response to the media application 104b accessing the media channel of the media channel provider 112b.

The method 200 also involves providing the authentication information from the extracted cookie 122 to the multi-channel media distributor 114 for authenticating the second media application 104b to access the second media channel, as depicted in block 240. For example, the computing device 102 can execute the access enabler module 106b to provide the authentication information to the multi-channel provider in a manner that is hidden from a user of the computing device 102. Providing the authentication information to the multi-channel media distributor 114 in a manner that is hidden from a user of the computing device 102 can involve the access enabler module 106b transmitting the authentication information over a data network to the multi-channel media distributor 114 without requiring the user to re-enter the authentication information. For example, providing the authentication information to the multi-channel media distributor 114 can involve providing data from a cookie (e.g., session information) that indicates to the multi-channel media distributor 114 that a media application executed at the computing device 102 has established a session with the multi-channel media distributor 114 and that a user of the computing device 102 has been authenticated for that session.

In some embodiments, one or more of the blocks 210-240 can be performed based on determining that the multi-channel media distributor 114 does not permit passive authentication or otherwise requires separate authentication processes for accessing different media channels. The computing device 102 can execute one or more of the access enabler modules 106a, 106b to determine that the multi-channel media distributor 114 does not permit a common authentication token to be used for authenticating both the first media application 104a and the second media application 104b. For example, an access enabler module 106a may determine whether the multi-channel media distributor 114 permits passive authentication in response to the media application 104a accessing an authentication interface provided by the multi-channel media distributor 114. In some embodiments, the access enabler module 106a may determine that the multi-channel media distributor 114 does not permit passive authentication by referencing the value of an SAML page in an authentication web page of the multi-channel media distributor 114. The access enabler module 106a may perform one or more of the cookie extraction operations based on determining that the multi-channel media distributor 114 does not permit passive authentication.

In additional or alternative embodiments, the access enabler module 106a may perform one or more cookie extraction operations based on the remote media service management application 110 confirming that the multi-channel media distributor 114 is a valid domain for performing the method 200. For example, the media service management application can use a list of web domains for which the media service management application 110 facilitates access. The list may be stored at or accessible by the media service management server 108. In response to the media application 104a accessing a web domain of the multi-channel media distributor 114, the access enabler module 106a may transmit a query to the media service management application 110 over a data network to determine whether the web domain of the multi-channel media distributor 114 is a domain for which the media service management application 110 facilitates access. The media service management application 110 can transmit a message over the data network to the access enabler module 106a confirming that the web domain of the multi-channel media distributor 114 is a domain for which the media service management application 110 facilitates access. Based (at least in part) on receiving the confirmatory message from the media service management application 110, the access enabler module 106a can extract cookies generated by authentication of the media application 104a with the multi-channel media distributor 114.

In additional or alternative embodiments, the access enabler module 106a may use the extracted cookie 122 to authenticate the second media application 104b based at least in part on the remote media service management application 110 confirming that valid entitlement data exists for the user. In some embodiments, confirming that valid entitlement data exists can involve determining that a subscription with the multi-channel media distributor 114 is used to authenticate the first media application 104a for accessing a first channel, and that the same subscription permits access to the second media channel by the second media application 104b. For example, one or more of an authentication token and an authorization token can be generated by the authentication of a first media application 104a with the multi-channel media distributor 114 for accessing a first media channel from the media channel provider 112a. The access enabler module 106b may subsequently detect that a second media application 104b is attempting to access a second media channel from the media channel provider 112b. In response to detecting the attempt to access the second media channel, the access enabler module 106b can transmit a query over a data network to the media service management application 110. The query can request confirmation that valid entitlement data exists for the second media application 104b to access a second media channel from the media channel provider 112b. Valid entitlement data may include, for example, one or more of an unexpired authentication token and an unexpired authorization token. The media service management application 110 can transmit a response to the query over the data network to the access enabler module 106b. If the response indicates that valid entitlement data exists, the access enabler module 106b can use authentication information from the extracted cookie 122 to authenticate the second media application 104b with the multi-channel media distributor 114. If the response does not indicate that valid entitlement data exists, the access enabler module 106b can access the multi-channel media distributor 114, which can present an authentication interface for a user of the computing device 102 to enter authentication credentials.

In some embodiments, a first media application 104a can perform a login that involves a user manually entering authentication information. The first media application 104a can request a list of cookie domains from the multi-channel media distributor 114. The list of cookie domains can be used by the first media application 104a to extract cookies from those domains after authentication with the multi-channel media distributor 114. In other embodiments, the media application 104a can perform a "diff" operation or similar process between pre-login and post-login states to identify one or more cookies generated by an authentication process with a multi-channel media distributor 114. If a second media application 104b performs an authentication process with respect to the multi-channel media distributor 114, the access enabler module 106b is used to transmit the cookie to the multi-channel media distributor 114 via HTTP or another suitable electronic communication. The cookie indicates to multi-channel media distributor that a session with the computing device 102 is established and that a user of the computing device 102 (and the media application 104b) is authenticated with the multi-channel media distributor.

Figure 3:
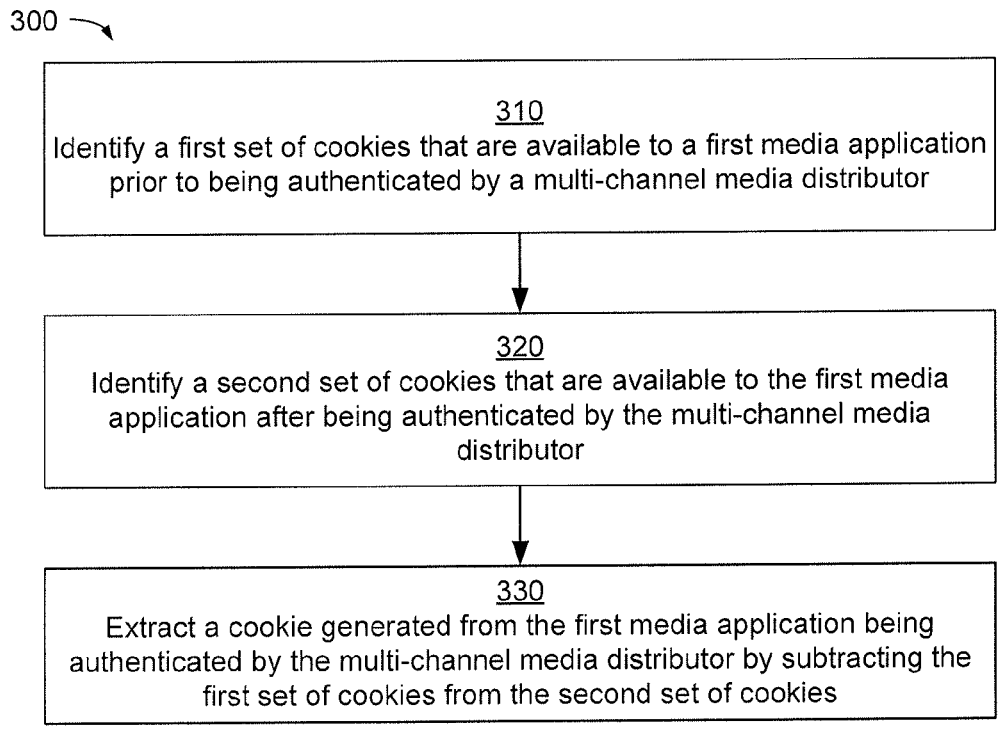
FIG. 3 is a flow chart illustrating an example of a method for extracting cookies used to automate authentication for multi-channel media distributors according to certain exemplary embodiments.

Any suitable process can be used to extract the cookie 122 from the media application 104a. For example, FIG. 3 is a flow chart illustrating an example of a method 300 for extracting cookies used to automate authentication for multi-channel media distributors. For illustrative purposes, the method 300 is described with reference to the implementation depicted in FIG. 1 and provides an example of an implementation for block 210 of the method 200. Other implementations, however, are possible.

The method 300 involves identifying a first set of cookies that are available to a first media application 104a prior to being authenticated by a multi-channel media distributor 114, as depicted at block 310. The computing device 102 can execute the access enabler module 106a to identify the first set of cookies. For example, the access enabler module 106a can identify the cookies in a cookie management object in response to the first media application 104a accessing a website or other authentication interface provided by the multi-channel media distributor 114. In one non-limiting example, the computing device 102 can be configured with an Android operating system. The access enabler module 106a can identify the first set of cookies managed by an Android cookie management object (e.g., android.webkit.CookieManager). In another non-limiting example, the computing device 102 can be configured with an iOS operating system. The access enabler module 106a can identify the first set of cookies managed by an iOS cookie management object (e.g., NSHTTPCookieStorage). The access enabler module 106a can generate a snapshot or other record of the first set of cookies prior to any authentication information being entered into the authentication interface provided by the multi-channel media distributor 114.

In some embodiments, cookies are extracted in the default format of the specific platform (e.g., the operating system of the computing device 102) and persisted in a local storage in the same format. In one non-limiting example involving an Android environment, a CookieManager in an Android operating system can use an application programming interface for getting and setting cookies in the form of raw strings, such as "public String getCookie" (String URL) and "public void setCookie" (String URL, String value). An example of a cookie string is "name1=value1; Expires=Wed, 9 Jun. 2021 10:18:14 GMT." For instance, a first media application 104a that is authenticated with the multi-channel media distributor 114 can extract the cookie 122 with the function CookieManager.getCookie(domain) and store the returned string (i.e., the cookie 122) to the shared storage resource 120 (e.g., a local storage). A second media application 104b that performs passive authentication can read the cookie 122 from the shared storage resource 120 and inject the cookie 122 in CookieManager using the function setCookie (domain, cookie).

In another non-limiting example involving an iOS environment, cookies can be manipulated using "NSHTTPCookie" objects. The NSHTTPCookie class has properties such as name, value, path, domain, or date of expiration. An access enabler module converts a cookie 122 that is an NSHTTPCookie object to an NSDictionary object, which includes one or more of these fields. The access enabler module saves the NSDictionary object representing the cookie 122 to the shared storage resource 120 (e.g., a local storage). An API function for getting cookie "[NSHTTPCookieStorage sharedHTTPCookieStorage] cookie" returns an NSArray containing NSHTTPCookie objects. An API function for setting cookies is "[NSHTTPCookieStorage sharedHTTPCookieStorage] setCookie:cookie]". For instance, a first media application 104a can extract the NSHTTPCookie object representing the cookie 122 from NSHTTPCookieStorage, convert the NSHTTPCookie object to an NSDictionary object, and serialize the NSDictionary object to the shared storage resource 120. A second media application 104b that performs passive authentication can read the NSDictionary object representing the cookie 122 from the shared storage resource, convert the NSDictionary object to an NSHTTPCookie object, and inject the NSHTTPCookie object to NSHTTPCookieStorage.

The method 300 also involves identifying a second set of cookies that are available to the media application 104a after being authenticated by the multi-channel media distributor 114, as depicted at block 320. The computing device 102 can execute the access enabler module 106a to identify the second set of cookies. For example, the access enabler module 106a can identify the cookies in a cookie management object of the first media application 104a after receiving confirmation from the multi-channel media distributor 114 that the first media application 104a has been successfully authenticated. The access enabler module 106a can generate a snapshot or other record of the second set of cookies.

The method 300 also involves extracting a cookie 122 by subtracting the first set of cookies from the second set of cookies, as depicted at block 330. For example, the computing device 102 can execute the access enabler module 106a to subtract the cookies in the first snapshot from the cookies in the second snapshot.

In a non-limiting example, an access enabler module can compare two arrays of cookie 122 objects. For example, in an iOS environment, the arrays of cookies objects can be arrays of NSDictionary objects (transformation of an NSHTTPCookie), where the NSDictionary contains the fields described above (name, value, path, date of expiration, etc.). The access enabler module iterates the first cookie array (cookies before authentication). For each cookie, the access enabler module determines whether the cookie exists in the second array (cookies after authentication). If a given cookie exists, that cookie is removed from the second array. After the access enabler module removes cookies from the second array, the second array includes the cookies generated by or otherwise obtained from an authentication process with the multi-channel media distributor 114. The array is stored to the shared storage resource 120.

Figure 4:
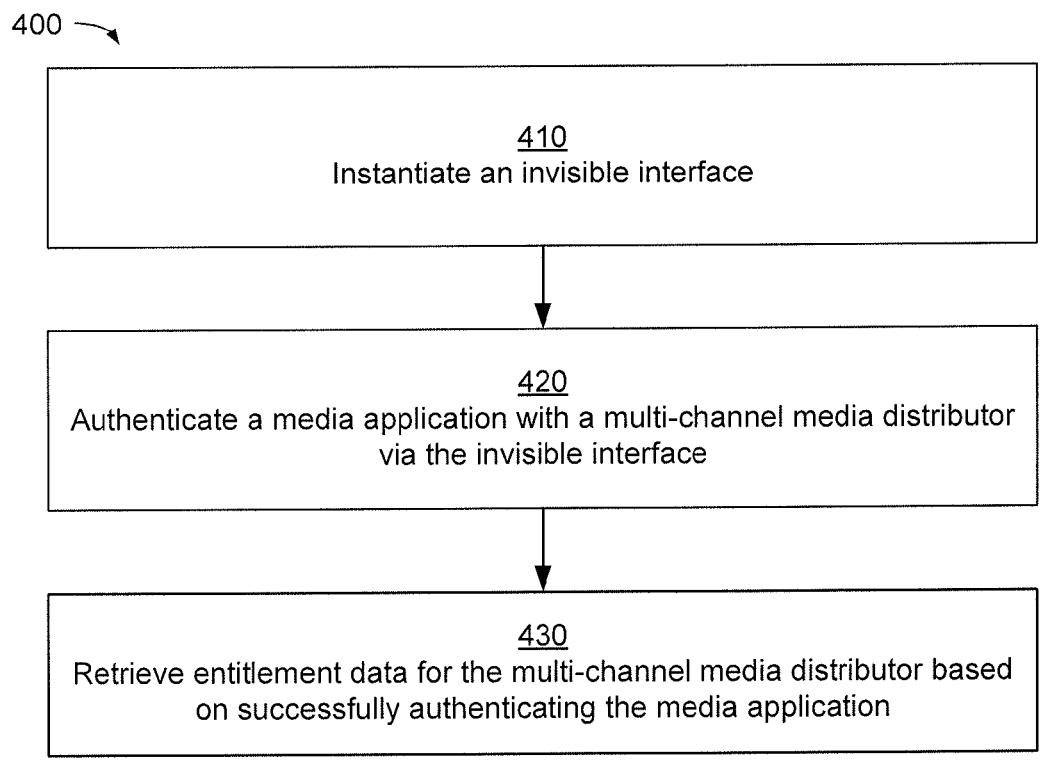
FIG. 4 is a flow chart illustrating an example of a method for transparently authenticating a media application by a multi-channel media distributor according to certain exemplary embodiments.

Any suitable process can be used for authenticating a media application 104b with a multi-channel media distributor 114 without requiring a user of the computing device 102 to re-enter authentication information. For example, FIG. 4 is a flow chart illustrating an example of a method 400 for transparently authenticating a media application by a multi-channel media distributor. For illustrative purposes, the method 400 is described with reference to the implementation depicted in FIG. 1 and provides an example of an implementation for block 240 of the method 200. Other implementations, however, are possible.

The method 400 involves instantiating an invisible interface, as depicted in block 410. For example, the computing device 102 can execute the access enabler module 106b to instantiates an invisible interface. Non-limiting examples of an invisible interface include an invisible web browser page (e.g., an android.webkit.WebView object for Android operating systems, a UIWebView object for iOS operating systems, etc.). The access enabler module 106b can use the invisible interface to access an authentication web page provided by the media service management application 110 that is executed on the media service management server 108.

The method 400 also involves authenticating the media application 104b with the multi-channel media distributor 114 via the invisible interface, as depicted in block 420. For example, the access enabler module 106b can cause an invisible web page or other invisible interface to be directed to an authentication web page of the multi-channel media distributor 114. The access enabler module 106b can perform this operation in response to a command from the media service management application 110 after the authentication web page provided by the media service management application 110 is accessed. The access enabler module 106b can enter the authentication information from the extracted cookie 122 at the authentication web page of the multi-channel media distributor 114.

The method 400 also involves retrieving entitlement data for the multi-channel media distributor 114 based on successfully authenticating the media application 104b, as depicted in block 430. For example, a custom URL or other network identifier may be generated by the remote media service management application 110 in response to a successful authentication of the media application 104b with the multi-channel media distributor 114. The custom URL or other network identifier can be provided to the computing device 102 via the invisible interface. The access enabler module 106b can determine from the presence of the custom URL or other network identifier that the media application 104b has been successfully authenticated with the multi-channel media distributor 114. The access enabler module 106b can retrieve entitlement data (e.g., an authorization token) from the media service management application 110 via the custom URL or other network identifier. The access enabler module 106b can store the entitlement data in a non-transitory computer-readable medium of the computing device 102.

In some embodiments, the access enabler module 106b can instantiate a timer object for managing the method 400. Non-limiting examples of a timer object include an android.os.CountDownTimer object for Android operating systems, an NSTimer object for iOS operating systems, etc. The timer object can be used to monitor the duration of the method 400 executed by the computing device 102. For example, the computing device 102 can terminate the method 400 if the timer object indicates that a predefined period (e.g., 60 seconds) has elapsed. Such a period may elapse if the web page provided by the remote media service management application 110 hangs on an intermediate web page due to an error in the flow, if the network connection is slow, etc.

Figure 5:
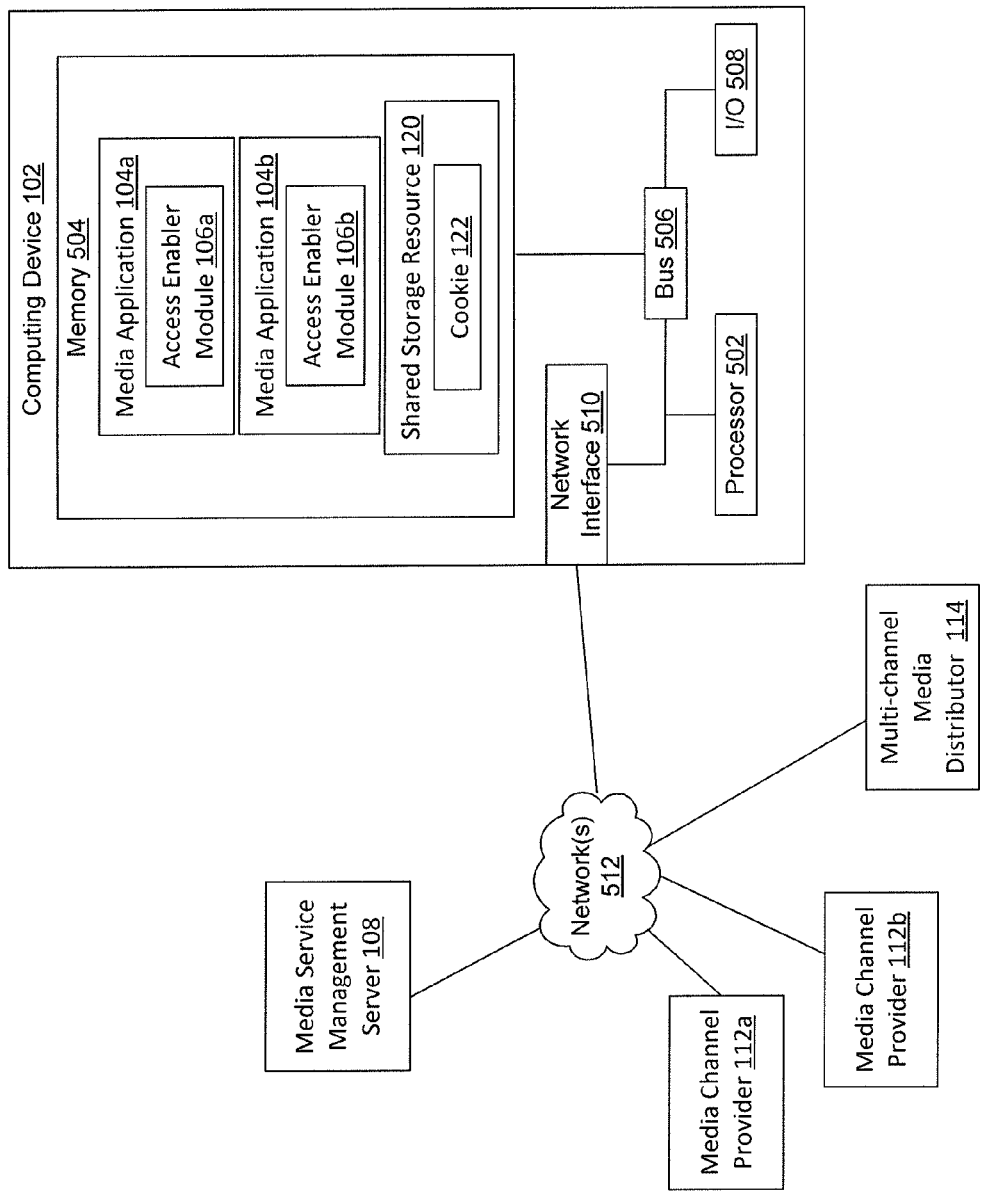
FIG. 5 is a block diagram depicting an example computing device for implementing certain embodiments.

FIG. 5 is a block diagram depicting an example of the computing device 102 for implementing certain embodiments. Non-limiting examples of the computing device 102 include a smart phone, a tablet computer, a laptop computer, a desktop computer, or any other computing device.

The computing device 102 can include a processor 502 that is communicatively coupled to a memory 504 and that executes computer-executable program instructions and/or accesses information stored in the memory 504. The processor 502 may comprise a microprocessor, an application-specific integrated circuit ("ASIC"), a state machine, or other processing device. The processor 502 can include any of a number of processing devices, including one. Such a processor can include or may be in communication with a computer-readable medium storing instructions that, when executed by the processor 502, cause the processor to perform the operations described herein.

The memory 504 can include any suitable computer-readable medium. The computer-readable medium can include any electronic, optical, magnetic, or other storage device capable of providing a processor with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 102 may also comprise a number of external or internal devices such as input or output devices. For example, the computing device 102 is shown with an input/output ("I/O") interface 508 that can receive input from input devices or provide output to output devices. A bus 506 can also be included in the computing device 102. The bus 506 can communicatively couple one or more components of the computing device 102.

The computing device 102 can execute program code that configures the processor 502 to perform the operations described in FIGS. 1-4. The program code can include one or more of the media applications 104a, 104b and the access enabler modules 106a, 106b. The program code may be resident in the memory 504 or any suitable computer-readable medium and may be executed by the processor 502 or any other suitable processor. In some embodiments, the shared storage resource 120 for storing the cookie 122 can be resident in the memory 504, as depicted in FIG. 5. In other embodiments, the shared storage resource 120 for storing the cookie 122 can be resident in a memory that is accessible via a data network, such as a memory accessible to a cloud service.

The computing device 102 can also include at least one network interface 510. The network interface 510 can include any device or group of devices suitable for establishing a wired or wireless data connection to one or more data networks 512. Non-limiting examples of the network interface 510 include an Ethernet network adapter, a modem, and/or the like. The computing device 102 can communicate with the media service management server 108, the media channel providers 112a, 112b, and/or the multi-channel media distributor 114 via the data network 512.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
    extracting, by a processing device, a cookie associated with a first media application that is inaccessible to a second media application executed by the processing device, wherein the cookie comprises authentication information that is associated with authenticating the first media application with a multi-channel media distributor for accessing a first media channel, wherein the authentication information indicates that the multi-channel media distributor has verified that a user has been authenticated from valid credentials provided to the multi-channel media distributor, wherein extracting the cookie comprises comparing (i) cookie information available to the first media application prior to an authentication process with the multi-channel media distributor and (ii) cookie information available to the first media application after the authentication process;
    storing the extracted cookie to a shared storage resource that is accessible to both the first media application and the second media application;
    responsive to the second media application accessing a second media channel, retrieving the extracted cookie from the shared storage resource;
    providing, by the second media application, the authentication information from the extracted cookie to the multi-channel media distributor for authenticating the second media application to access the second media channel;
    receiving an authorization token indicating that the second media channel is included in a subset of channels from the multi-channel media distributor for which the valid credentials provide access; and
    using the received authorization token to access the second media channel.

2. The method of claim 1, further comprising determining, by the processing device, that the multi-channel media distributor requires separate authentication processes for accessing the first and second media channels, wherein the extracted cookie is retrieved based on determining that the multi-channel media distributor requires the separate authentication processes.

3. The method of claim 2, wherein the first media application is authenticated with the multi-channel media distributor for accessing the first media channel based on a subscription with the multi-channel media distributor that permits access to the first media channel;
    wherein the extracted cookie is also accessed based on determining, by the processing device, that the subscription permits access to the second media channel by the second media application.

4. The method of claim 1, wherein the cookie is extracted based on:
    querying, by the processing device, an media service management application via a data network to determine whether the media service management application facilitates access to the multi-channel media distributor; and
    receiving, by the processing device, confirmation via the data network that the media service management application facilitates access to the multi-channel media distributor.

5. The method of claim 1, wherein extracting the cookie from the first media application further comprises:
    identifying a first plurality of cookies that is available to the first media application prior to performing the authentication process with the multi-channel media distributor;
    identifying a second plurality of cookies that is available to the first media application subsequent to performing the authentication process with the multi-channel media distributor;
    subtracting the first plurality of cookies from the second plurality of cookies;
    identifying a cookie generated by the performed authentication process with the multi-channel media distributor; and
    extracting the identified cookie with a function provided by an application programming interface.

6. The method of claim 1, wherein the first media application is authenticated by accessing a website provided by the multi-channel media distributor via a visible interface and wherein the authentication information from the extracted cookie is provided to the multi-channel media distributor for authenticating the second media application by accessing the website via an invisible interface.

7. The method of claim 1, wherein the cookie being inaccessible to the second media application comprises a restraint on the processing device preventing the second media application from receiving the cookie from the first media application.

8. The method of claim 7, wherein the restraint is associated with a sandboxing policy for an operating system executed by the processing device.

9. The method of claim 1, wherein at least one of the first and second media applications is configured to access at respective one of the first and second media channels and is unable to access media channels other than the respective one of the first and second media channels.

10. The method of claim 1, wherein storing the extracted cookie to the shared storage resource comprises storing the extracted cookie to a non-transitory computer-readable medium of a computing device in which the processing device is comprised.

11. The method of claim 1, wherein storing the extracted cookie to the shared storage resource comprises transmitting, by the processing device, the extracted cookie to the shared storage resource via a data network.

12. The method of claim 1, wherein extracting the cookie from the first media application further comprises:
identifying, in a cookie management object, a first set of cookies that are available to the first media application prior to being authenticated by the multi-channel media distributor;
generating a first record of the first set of cookies;
identifying, in the cookie management object, a second set of cookies that are available to the first media application after being authenticated by the multi-channel media distributor;
generating a second record of the second set of cookies; and
subtracting the cookies in the first record from the cookies in the second record.

13. A system comprising:
a processing device; and
a non-transitory computer-readable medium communicatively coupled to the processing device,
wherein the processing device is configured to execute instructions to perform operations comprising:
extracting a cookie associated with a first media application that is inaccessible to a second media application executed by the processing device, wherein the cookie comprises authentication information that is associated with authenticating the first media application with a multi-channel media distributor for accessing a first media channel, wherein the authentication information indicates that the multi-channel media distributor has verified that a user has been authenticated from valid credentials provided to the multi-channel media distributor, wherein extracting the cookie comprises comparing (i) cookie information available to the first media application prior to an authentication process with the multi-channel media distributor and (ii) cookie information available to the first media application after the authentication process;
storing the extracted cookie to a shared storage resource that is accessible to both the first media application and the second media application;
responsive to the second media application accessing a second media channel, retrieving the extracted cookie from the shared storage resource;
providing, by the second media application, the authentication information from the extracted cookie to the multi-channel media distributor for authenticating the second media application to access the second media channel;
receiving an authorization token indicating that the second media channel is included in a subset of channels from the multi-channel media distributor for which the valid credentials provide access; and
using the received authorization token to access the second media channel.

14. The system of claim 13, wherein the operations further comprise determining that the multi-channel media distributor requires separate authentication processes for accessing the first and second media channels, wherein the extracted cookie is retrieved based on determining that the multi-channel media distributor requires the separate authentication processes.

15. The system of claim 13, wherein extracting the cookie from the first media application further comprises:
identifying a first plurality of cookies that is available to the first media application prior to performing the authentication process with the multi-channel media distributor;
identifying a second plurality of cookies that is available to the first media application subsequent to performing the authentication process with the multi-channel media distributor;
subtracting the first plurality of cookies from the second plurality of cookies;
identifying a cookie generated by the performed authentication process with the multi-channel media distributor; and
extracting the identified cookie with a function provided by an application programming interface.

16. The system of claim 13, wherein the first media application is authenticated by accessing a website provided by the multi-channel media distributor via a visible interface and wherein the authentication information from the extracted cookie is provided to the multi-channel media distributor for authenticating the second media application by accessing the website via an invisible interface.

17. The system of claim 13, wherein the shared storage resource is comprised in the non-transitory computer-readable medium of the system.

18. A non-transitory computer-readable medium having program code stored thereon, the program code comprising:
program code for extracting a cookie associated with a first media application executed by a processing device, wherein the cookie is inaccessible to a second media application executed by the processing device and comprises authentication information that is associated with authenticating the first media application with a multi-channel media distributor for accessing a first media channel, wherein the authentication information indicates that the multi-channel media distributor has verified that a user has been authenticated from valid credentials provided to the multi-channel media distributor, wherein extracting the cookie comprises comparing (i) cookie information available to the first media application prior to an authentication process with the multi-channel media distributor and (ii) cookie information available to the first media application after the authentication process;

program code for storing the extracted cookie to a shared storage resource that is accessible to both the first media application and the second media application;

program code for retrieving the extracted cookie from the shared storage resource responsive to the second media application accessing a second media channel;

program code for providing the authentication information from the extracted cookie to the multi-channel media distributor for authenticating the second media application to access the second media channel;

program code for receiving an authorization token indicating that the second media channel is included in a subset of channels from the multi-channel media distributor for which the valid credentials provide access; and program code for using the received authorization token to access the second media channel.

19. The non-transitory computer-readable medium of claim 18, further comprising program code for determining that the multi-channel media distributor requires separate authentication processes for accessing the first and second media channels, wherein the extracted cookie is retrieved based on determining that the multi-channel media distributor requires the separate authentication processes; wherein the first media application is authenticated by accessing a website provided by the multi-channel media distributor via a visible interface and wherein the authentication information from the extracted cookie is provided to the multi-channel media distributor for authenticating the second media application by accessing the website via an invisible interface.

20. The non-transitory computer-readable medium of claim 18, wherein extracting the cookie from the first media application further comprises program code for:

identifying a first plurality of cookies that is available to the first media application prior to being authenticated by the multi-channel media distributor;

identifying a second plurality of cookies that is available to the first media application subsequent to being authenticated by the multi-channel media distributor; and subtracting the first plurality of cookies from the second plurality of cookies;

identifying a cookie generated by the performed authentication process with the multi-channel media distributor; and extracting the identified cookie with a function provided by an application programming interface.

* * * * *